US006578358B1

United States Patent
Schuh

(10) Patent No.: US 6,578,358 B1
(45) Date of Patent: Jun. 17, 2003

(54) MOTION STOP CONTROL FOR VEHICLE

(75) Inventor: Scott N. Schuh, Fort Ransom, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/676,416

(22) Filed: Sep. 29, 2000

(51) Int. Cl.[7] ............................................. F16D 31/02
(52) U.S. Cl. ..................................................... 60/448
(58) Field of Search .......................... 60/448, 447, 431

(56) References Cited

U.S. PATENT DOCUMENTS

| | | | |
|---|---|---|---|
| 3,913,453 A | 10/1975 | Parquet ........................ | 91/420 |
| 3,915,068 A | 10/1975 | Gassman ...................... | 91/420 |
| 4,235,297 A | 11/1980 | Porta ........................... | 180/6.48 |
| 4,494,624 A | 1/1985 | Scheuerle et al. ............ | 180/308 |
| 5,184,466 A | 2/1993 | Schniederjan et al. ....... | 60/488 |
| 5,199,525 A | 4/1993 | Schueler ...................... | 180/242 |
| 5,201,570 A | 4/1993 | Heren et al. .................. | 303/10 |
| 5,258,912 A | 11/1993 | Ghoneim et al. ............. | 364/424.05 |
| 5,390,759 A | 2/1995 | Gollner ........................ | 180/307 |
| 5,456,332 A | 10/1995 | Borenstein ................... | 180/167 |
| 6,027,177 A | 2/2000 | Ferguson et al. ............. | 303/3 |

FOREIGN PATENT DOCUMENTS

| | | |
|---|---|---|
| EP | 0 477 510 A2 | 4/1992 |
| EP | 0 505 254 A1 | 9/1992 |
| EP | 0 985 592 A2 | 9/1999 |

Primary Examiner—Edward K. Look
Assistant Examiner—Michael Leslie
(74) Attorney, Agent, or Firm—Westman, Champlin & Kelly, P.A.

(57) ABSTRACT

A self-propelled vehicle, such as a loader, has a hydrostatic drive that includes hydrostatic motors to drive ground engaging wheels under control of the operator. The rotational speed of the motors is proportional to an operator control input provided to a controller which in turn regulates the flow of hydraulic fluid under pressure from a pressure source to the motors. In the form shown, the regulation of the hydraulic fluid under pressure to the motors is achieved by utilizing electrical displacement control pumps that will provide a flow of fluid to a connected motor in direct proportion to an input signal as the flow source. The motors are fixed displacement motors, and when the wheels tend to overrun as the vehicle rolls down a hill or incline, the motors will act as pumps. The movement of the wheels is sensed to provide a signal to the controller to adjust one or both of the electrical displacement control pumps to provide a balancing counter pressure at the high pressure side work port of the associated motor to insure that the vehicle will not creep or roll when it should be stopped.

7 Claims, 4 Drawing Sheets

MOTION STOP CONTROL FOR VEHICLE

BACKGROUND OF THE INVENTION

The present invention relates to a control system for preventing a vehicle, such as a skid steer loader, that has hydrostatic drive motors for the wheels, from rolling or creeping on an incline when the operator controls are in neutral and the vehicle should remain stationary. No independent brake needs to be applied. The vehicle has hydrostatic motors for the wheels. The motors are driven by pumps which are responsive to electrical signals controlled by an operator input, which can be changed to vary the ground speed. When the input control signal is zero, which indicates the vehicle should be stationary, any movement of the vehicle will result in a signal being generated that will be utilized to counterbalance the pressure created in the drive motors to cause the vehicle to remain stationary.

It is well known to use hydrostatic motors for driving industrial vehicles, such as self-propelled loaders. Hydrostatic drive systems utilize controls for variable volume flow of fluid between an inlet port of the motors, and an outlet port. The use of joysticks for controlling such vehicles also is well known, and the joysticks can be used for steering, speed control, and forward and reverse drive as well as loader lift arm and back tilt functions.

Controller systems with software implementation utilizing a plurality of inputs and providing signals to drive pumps are known as well.

An automotive type drive that utilizes a microprocessor for controlling hydrostatic transmissions is shown in U.S. Pat. No. 5,390,759, and a transmissions is shown in U.S. Pat. No. 5,390,759, and a control circuit for an all wheel drive vehicle is illustrated in U.S. Pat. No. 5,199,525.

A hydrostatic transmission that has a retarder valve that provides a braking effect if the motors are driven mechanically and begin to function as pumps, is shown in U.S. Pat. No. 3,913,453. The system shown in U.S. Pat. No. 3,913,453 does not provide for an actual stopping of the movement of the vehicle, but rather retards its movement.

SUMMARY OF THE INVENTION

The present invention relates to a control system for a vehicle driven by hydrostatic motors that will stop movement of the vehicle when the drive controls are in neutral. The drive circuit is a hydrostatic drive circuit which controls the flow of hydraulic fluid under pressure to the motors. The vehicle is a drive-by-wire vehicle where an operator control generates electrical signals provided to a digital controller that provides the signals for varying the drive pump speed and controlling the direction of movement.

In the self-propelled vehicle shown, two hydrostatic motors are used, one for the wheels on each side of the vehicle. The hydrostatic motors are preferably fixed displacement piston motors but can be variable displacement motors, and when the vehicle tends to roll, the motors will act as pumps and will create a back pressure in the system. Vehicle motion is sensed, with sensors called wheel sensors, preferably by sensing output axle or final drive rotation. The wheel sensor signals are used in the controller as a feedback for controlling the vehicle drive. The slightest motion can be detected, so motion of the wheels is resisted and the vehicle is held stationary.

When the operator control is at a zero velocity or stopped position, and the wheels roll to cause the drive motors to act as pumps, the wheel speed sensors signals are utilized in the controller to create a counter balance pressure at the input to the hydrostatic motors to counterbalance the higher pressure at one motor port that is created by a tendency to roll on an incline. The force or pressure balance is maintained to prevent unwanted motion.

The wheel sensors will provide signals to the controller not only indicating that the wheels are rolling, but also indicating the direction that they are rolling. The signal is used as an input to the controller, which will provide a signal to electrical displacement control pumps used to drive one or both motors provided on the skid steer loader illustrated, to balance the pressure being generated by the motor movement and stop the motor or motors from rotating.

The control system is based on electronic output from a joystick, or other operator controls that are used for operating the drive system. Wheel rotation direction and speed is sensed, and that signal is used to generate a control signal to the pump until roll is stopped.

DETAILED DESCRIPTION OF THE ILLUSTRATIVE EMBODIMENTS

Figure 1:
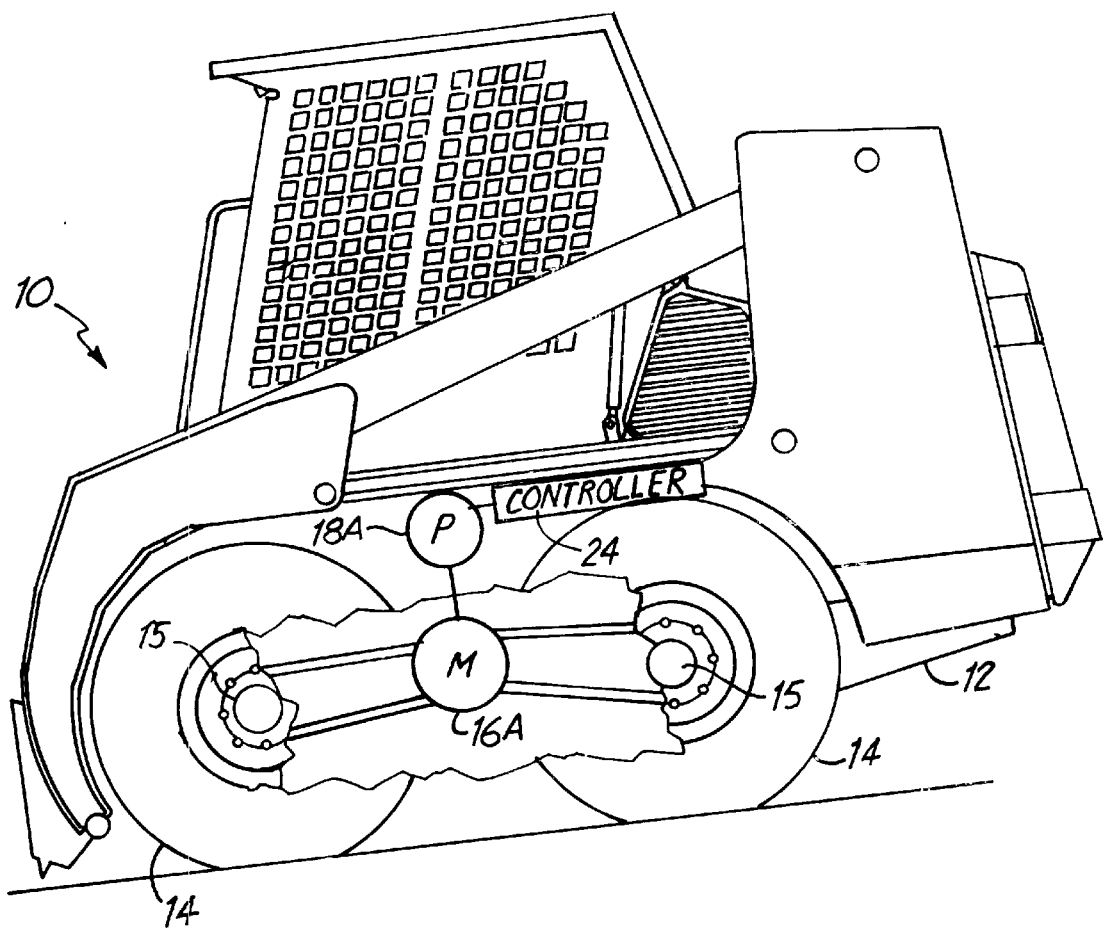
FIG. 1 is a schematic side view of a typical skid steer loader on an incline, utilizing the controls of the present invention.

The skid steer loader vehicle indicated generally at 10 is schematically shown, and has a main frame 12 that is mounted on wheels 14. The wheels 14 are driven by hydraulic or hydrostatic motors 16A and 16B, one on each side of the frame. Chain drives from the motors 16A and 16B drive axles 15 on which the wheels 14 are mounted. The loader shown is an operate by wire loader that utilizes at least one joystick control 30 providing voltage inputs to a central controller 24. The central controller 24 provides proportional control signals to electrically controlled variable displacement pumps 18A and 18B that in turn provide flow to inlet or system ports 17A and 17B of the motors 16A and 16B (see FIG. 3). When considering forward direction the motors 16A and 16B also have outlet or system ports 19A and 19B. The hydrostatic drive is a closed loop system so the ports 17A and 17B would be outlets for reverse direction movement and ports 19A and 19B would be inlet ports.

The pumps 18A and 18B in turn regulate the speed of rotation, direction, and/or power of the motors. Both forward and rearward drive are controlled by the pumps 18A and 18B as signalled by joystick 30. The voltage signal from a potentiometer or other variable voltage source driven by the joystick used will indicate whether the drive should be forward or reverse. Normally a voltage signal from a normal 0 volts for a stopped position variable to plus or minus 4.5 volts DC for maximum speed will be used. The joystick will have a dead band at the off position so movement may occur only after a signal of 0.5 volts is provided.

The loader 10 can be a steered wheel loader, as well as a skid steer loader or other utility or work vehicle. The type of steering is not critical to operation of the present invention.

The joystick control can be used for steering as well as speed control. The controller 24 will provide signals to valves for steering cylinders, as well as receive feedback signals indicating actual steer angles, as indicated at 21 in FIG. 3.

The all wheel steer arrangement shown, is one illustration of the type of loader that can be satisfactorily operated with the present system. With a wheel steer loader only one joystick, which controls direction and speed is needed. Two joysticks, one for the pump on each side of the loader may be used and two joysticks are illustrated in FIGS. 2 and 3.

Figure 2:
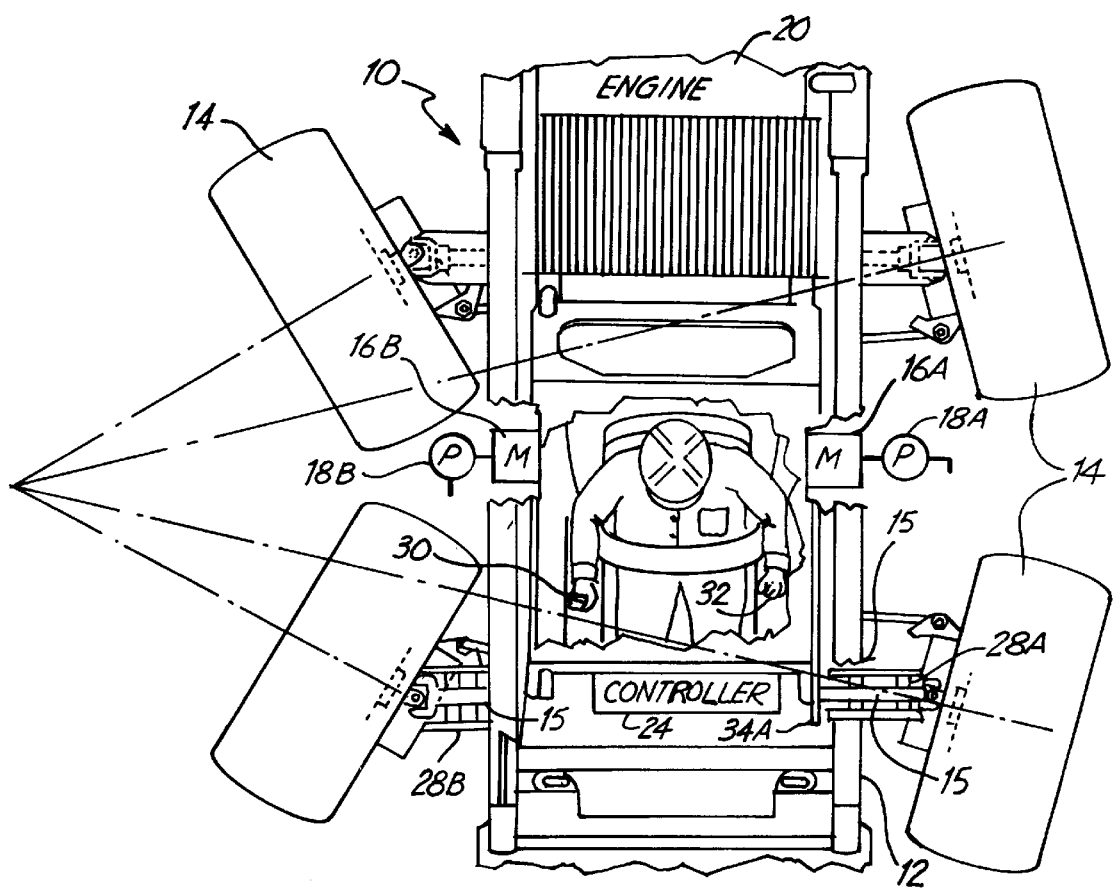
FIG. 2 is a top schematic view showing a loader with parts broken away to show hydrostatic drive motors in position.
Figure 3:
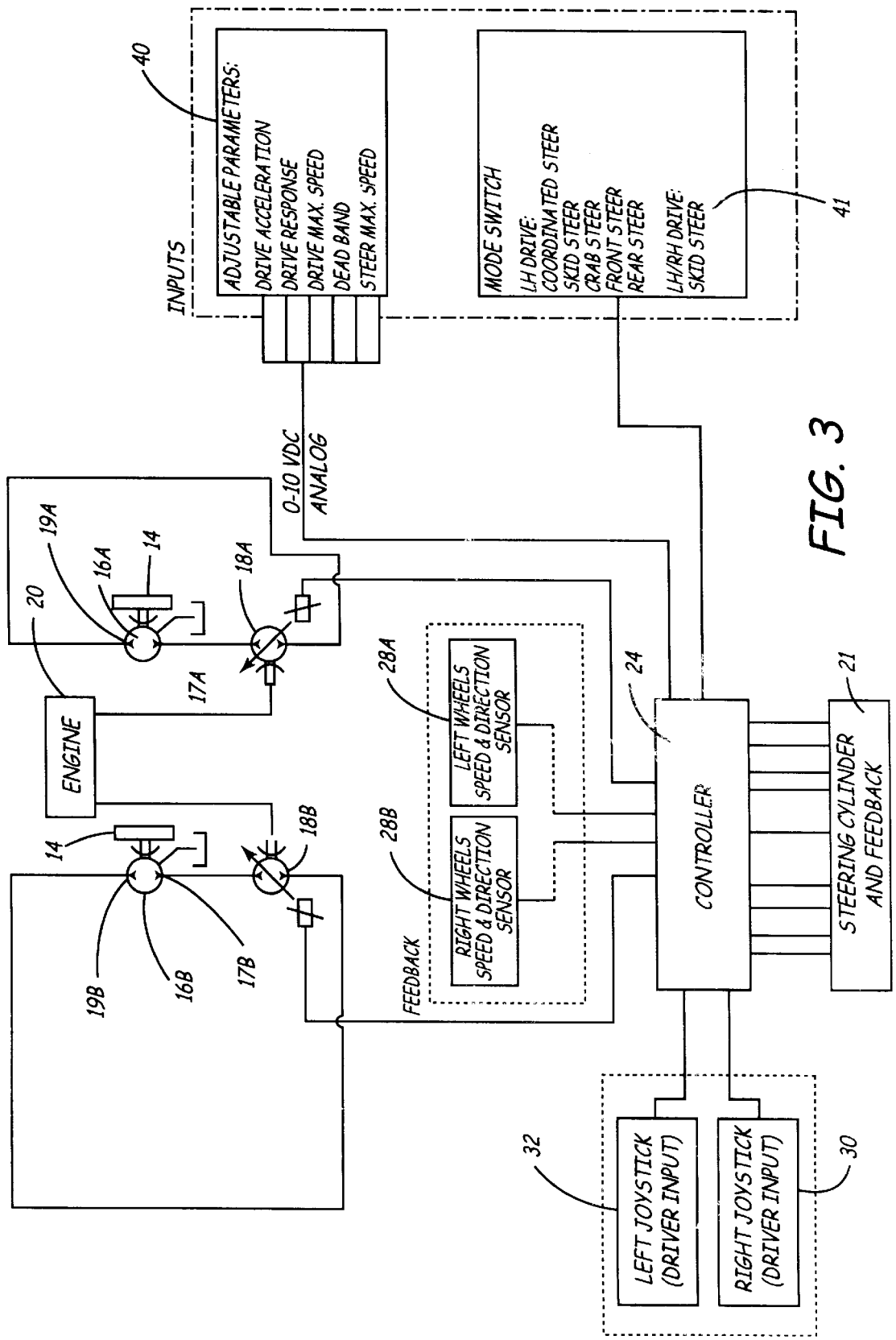
FIG. 3 is a block diagram illustrating the circuit of the present invention.

As shown in FIG. 2, and in FIG. 3, schematically, the motors 16A and 16B are controlled by the electronically controlled variable displacement pumps 18A and 18B, which provide an output flow proportional to the electronic (voltage) signal from controller 24. The controller 24 receives inputs from a joystick or other propulsion or speed control. Two joysticks indicated at 30 and 32 are illustrated.

An increase in voltage from a controlling joystick will cause the controlled pump output to increase and the associated or connected motor is driven at an increasing speed proportional to the voltage signal from the joystick. The joysticks are conventional units that provide a variable electrical signal depending on the position of the joystick controlling that pump. The pumps are commercially available electrical displacement control (EDC) pumps. The motors act as pumps when driven by a wheel.

Wheel speed and direction sensors shown schematically at 28A and 28B for the left and right hand sides of the unit are provided for feedback to the controller. Since the front and rear wheels 14 on each side of the frame are driven from a common motor only one wheel speed sensor is needed for the left-side wheels and only one for the right-side wheels of the loader. The wheel speed sensors can be of any desired configuration. The wheel speed sensors are capable of not only determining the speed of the wheels, for example by sensing marks on relatively rotating parts, such as cogs or notches in a sprocket shown schematically at 34A, but also can determine the direction of rotation. This can be done with conventional sensors such as Hall effect sensors and suitable targets on the moving part. A rotational sensor built into wheel bearings that provides information indicating speed of rotation and direction of a supported shaft such as the wheel axle of the loader, is available from Torrington Bearing Company, Torrington, Conn., USA. Hall effect magnetic sensors on the motor output shafts that sense magnetic material targets also can be used. Such sensors are used in various applications, such as computer printers, as well as on machinery. Electrical Displacement Control Pumps (EDC) 18A and 18B are shown. The pumps can be Sauer-Danfoss Series 42 EDC pumps driven from the engine 20. Sauer-Danfoss Inc. is located in Ames, Iowa, USA. The motors 16A and 16B may be conventional fixed displacement radial piston motors, which are available from Rexroth Hydraulics business unit of Mannesman Rexroth Group of Germany. The amount of fluid under pressure that is provided from the associated EDC pump determines the speed of motor rotation. There also are other types of pumps which are controlled by electrical input signals and will provide the desired outputs to control creep.

If desired, various adjustable parameters indicated at 40 can be provided to the controller 24. If the vehicle is a steerable wheel vehicle as shown, a mode switch 41 can be provided to provide for coordinated steer, crab steer, front wheel steer, or rear wheel steer as shown in the prior art. Skid steer can be provided as well. The controller 24 also has outputs 43 for the steering cylinders and steering feedback signals used for a wheel steer loader.

Figure 4:
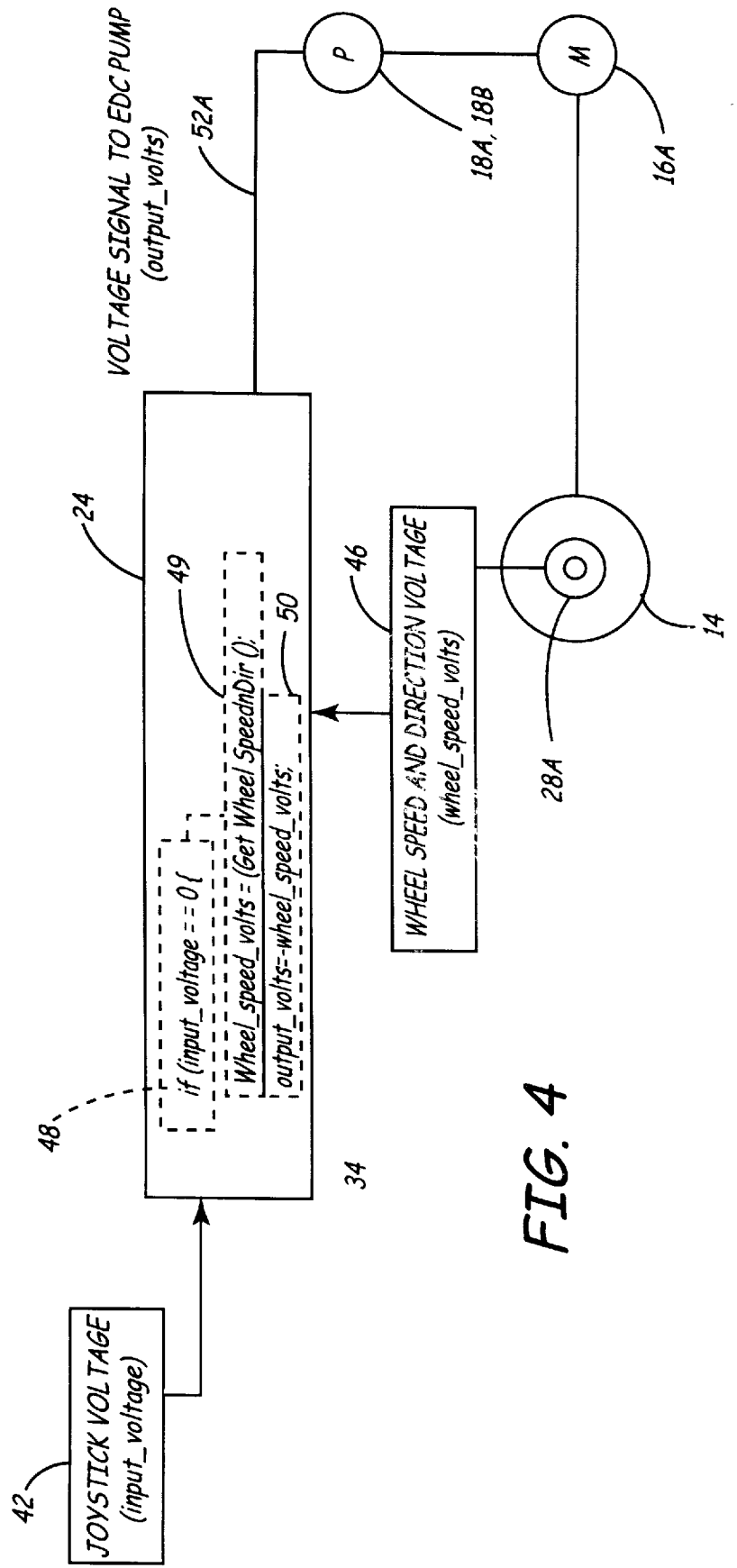
FIG. 4 is a block diagram of the control functions of the controller.

FIG. 4 shows a more detailed schematic of the hydrostatic drive circuit of the present invention, where a joystick voltage input is indicated at 42, and it is provided as an input to the controller 24. The controller 24 can be a microprocessor or computer of suitable design. The wheel speed and direction voltage provided by a quadrature output from the wheel sensors 28A and 28B provides input shown at 46 from the respective sides of the loader. The input indicating wheel speed or rotation is used as a feedback signal when the wheels are driven, and as a signal to stop creep or unwanted rolling of the wheel when the vehicle should be stopped.

The controller 24 uses the joystick voltage input to provide an output that adjusts the output flow of the respective EDC pump 18A and 18B. The pumps are individually controlled, and when the joystick input voltage equals zero as shown at 48 meaning that the operator command is "stop", an inquiry in the controller program is made. If the input 46 from a wheel speed sensor carries a voltage signal to the controller it means that the wheels are rotating. The controller receives the wheel speed sensor signal to indicate speed and direction of rotation as indicated at 49. An output voltage signal 50 is generated. The output voltage signal 50 from the controller will be equal to and opposite from, or a selected function of, the wheel speed feedback voltage signal. The output voltage signal to the variable displacement pumps which is provided along a line 52 to the appropriate pump, as shown, 18A and 18B (one or both pumps can be controlled), will be just enough to provide hydraulic fluid under pressure to the high pressure work port of the motors to counterbalance the back pressure induced on the motors by the wheels when the vehicle tends to roll on an incline. The output voltage signal to the variable displacement pump or pumps will be adjusted to insure that the loader will not roll, when the joystick input signal is zero.

The signal on line 50 would be variable to drive the pumps when the joystick is in a drive position, other than the zero or stop position. The wheel speed signal will be used as a feedback for closed loop speed control.

Thus, after the joystick is in its neutral position so that the input voltage signal from the joystick to the controller 24 is at zero, any movement of the loader, either forward or backward that is sensed will be resisted and stopped by a counterbalancing pressure from the EDC pumps as controlled by the voltage signal directed to control the pump outputs. Pressure is created at the appropriate motor work ports to counterbalance the pressure generated by the motors as the fixed displacement motors are driven by the wheels and become pumps. The pressure can be at either one of the work ports of the motors, depending on the direction of rotation of the wheels.

The control signal for balancing back pressure can be used with electronically controlled swash plate pumps which provide output flow as a function of an input signal. As schematically shown herein, EDC pumps provide a pressure and flow to a connected motor as a function of the input voltage signal from controller 24 pumps that are controlled by electrical signals.

Although the present invention has been described with reference to preferred embodiments, workers skilled in the art will recognize that changes may be made in form and detail without departing from the spirit and scope of the invention.

What is claimed is:

1. A motion stop control for stopping rotation of a hydrostatic motor when operating as a pump driven by a wheel, comprising an electrically controlled variable displacement pump coupled to said motor, an operator control providing an input signal to indicate a desired amount of rotation of the motor, said operator control input signal adjusting the hydraulic power delivered by the pump to the motor, a sensor for sensing rotation of the wheel driven by the hydrostatic motor, and a controller for receiving the input signal and a signal from the sensor to provide a pressure from the pump sufficient to balance pressure at a work port of the motor generated by the wheel driving the motor to stop the movement of the wheel when the input signal indicates the wheel should stop, wherein the motor is a fixed displacement radial piston motor having a pair of work ports connected to the variable displacement pump.

2. A hydrostatic drive circuit for controlling the drive wheels of a vehicle, said drive circuit comprising a fixed displacement drive motor for driving at least one wheel of the vehicle, said drive motor having two work ports, a hydrostatic pump having an output for providing hydraulic fluid under pressure to one work port of the motor, a control for controlling the flow of pressurized hydraulic fluid between the pump and the one motor work port to rotate the motor at a rate which is a function of a control signal, a sensor for sensing rotation of the motor, the motor acting as a pump when driven by rotation of the wheel at a rate greater than a rate provided by the control signal, and said control providing an output of hydraulic fluid under pressure from the pump to the one work port of the motor to counterbalance pressure developed by the motor being driven by the rotation of a drive wheel when an operator input to the control indicates the drive wheels should be at rest.

3. The hydrostatic drive circuit of claim 2, wherein said control controls output of the pump to the one work port of the motor.

4. The hydrostatic drive of claim 2, wherein said pump is an electrical displacement control pump and the control includes a joystick control and an electronic controller, the joystick providing a voltage to the electronic controller indicating when the motor is to be driven, and the electronic controller providing a signal to the electrical displacement control pump to drive the motor in response to the input voltage from the joystick.

5. The hydrostatic drive of claim 2, wherein there are two motors on the vehicle, each of the motors having a separate electrical displacement control pump driving the respective motor, and the control controlling the amount of hydraulic fluid under pressure delivered to each of the motors from the separate electrical displacement control pumps.

6. A hydrostatic drive circuit for controlling the drive wheels of a vehicle, said drive circuit comprising a drive motor for driving at least one wheel of the vehicle, said drive motor having two work ports, a hydrostatic pump having an output for providing hydraulic fluid under pressure to one work port of the motor, a control for controlling the flow of pressurized hydraulic fluid between the pump and the one motor work port to rotate the motor at a rate which is a function of a control signal, a sensor for sensing rotation of the motor, the motor acting as a pump when driven by rotation of the wheel at a rate greater than a rate provided by the control signal, and said control providing an output of hydraulic fluid under pressure from them pump to the one work port of the motor to counterbalance pressure developed by the motor being driven by the rotation of a drive wheel when an operator input to the control indicates the drive wheels should be at rest, said pump comprising an electrically controlled pump providing an output to the one work port of the motor in proportion to an electrical input signal, and the control including a controller for receiving a signal to indicate when the wheels should be at rest, and for receiving a signal from the sensor indicating wheel rotation, the controller providing an electrical signal to the pump to provide a pressure at the one work port of the motor associated with the sensor indicating wheel rotation to counterbalance the pressure at the one work port of the motor as the motor tends to be driven by the associated wheel.

7. A hydrostatic drive circuit for controlling the drive wheels of a vehicle, said drive circuit comprising a drive motor for driving at least one wheel of the vehicle, said drive motor having two work ports, a hydrostatic pump having an output for providing hydraulic fluid under pressure to one work port of the motor, a control for controlling the flow of pressurized hydraulic fluid between the pump and the one motor work port to rotate the motor at a rate which is a function of a control signal, a sensor for sensing rotation of the motor, the motor acting as a pump when driven by rotation of the wheel at a rate greater than a rate provided by the control signal, and said control providing an output of hydraulic fluid under pressure from them pump to the one work port of the motor to counterbalance pressure developed by the motor being driven by the rotation of a drive wheel when an operator input to the control indicates the drive wheels should be at rest, wherein said pump is an electrical displacement control pump and the control includes a joystick control and an electronic controller indicating when the motor is to be driven, and the electronic controller providing a voltage to the electrical displacement control pump to drive the motor in response to the input signal from the joystick, said joystick control having a neutral position indicating that the controlled wheels should be stopped with no voltage to the electronic controller, and the electronic controller sensing a signal indicating any wheel movement driving a respective motor and utilizing such signal to control the pump to counterbalance pressures developed at the one work port of the motor being driven by the wheel.

* * * * *

UNITED STATES PATENT AND TRADEMARK OFFICE
CERTIFICATE OF CORRECTION

PATENT NO. : 6,578,358 B1
DATED : June 17, 2003
INVENTOR(S) : Scott N. Schuh

It is certified that error appears in the above-identified patent and that said Letters Patent is hereby corrected as shown below:

Column 6,
Line 7, "them" should be -- the --
Line 35, "them" should be -- the --
Line 41, after "controller" insert -- , the joystick providing a voltage to the electronic controller --

Signed and Sealed this

Eighteenth Day of May, 2004

JON W. DUDAS
*Acting Director of the United States Patent and Trademark Office*